(12) United States Patent
Ori

(10) Patent No.: US 10,066,277 B2
(45) Date of Patent: Sep. 4, 2018

(54) CEMENTED CARBIDE AND COATED CEMENTED CARBIDE

(71) Applicant: TUNGALOY CORPORATION, Fukushima (JP)

(72) Inventor: Shinya Ori, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 0 days.

(21) Appl. No.: 15/579,901

(22) PCT Filed: Jun. 2, 2016

(86) PCT No.: PCT/JP2016/066509
§ 371 (c)(1),
(2) Date: Dec. 5, 2017

(87) PCT Pub. No.: WO2016/199686
PCT Pub. Date: Dec. 15, 2016

(65) Prior Publication Data
US 2018/0179615 A1 Jun. 28, 2018

(30) Foreign Application Priority Data
Jun. 12, 2015 (JP) .................. 2015-118847

(51) Int. Cl.
*C22C 29/02* (2006.01)
*B23B 27/14* (2006.01)

(52) U.S. Cl.
CPC ............ *C22C 29/02* (2013.01); *B23B 27/148* (2013.01); *B23B 2228/10* (2013.01); *B23B 2228/36* (2013.01)

(58) Field of Classification Search
CPC .............. B23B 27/148; B23B 2228/10; B23B 2228/36; C22C 29/02
See application file for complete search history.

(56) References Cited

U.S. PATENT DOCUMENTS

| 4,966,501 A | * | 10/1990 | Nomura | B23B 27/148 407/119 |
| 5,700,569 A | * | 12/1997 | Ruppi | C23C 16/32 428/336 |
| 6,379,798 B1 | * | 4/2002 | Yazaki | C23C 14/0015 428/408 |
| 2012/0225247 A1 | * | 9/2012 | Sone | C23C 16/34 428/141 |
| 2014/0227052 A1 | * | 8/2014 | Hirano | B23C 5/16 407/115 |

FOREIGN PATENT DOCUMENTS

JP 2009-074121 A 4/2009

OTHER PUBLICATIONS

International Preliminary Report on Patentability and Written Opinion Issued in PCT/JP2016/066509 dated Dec. 12, 2017.
International Search Report issued in PCT/JP2016/066509; dated Aug. 30, 2016.

* cited by examiner

*Primary Examiner* — Pegah Parvini
(74) *Attorney, Agent, or Firm* — Studebaker & Brackett PC

(57) ABSTRACT

A cemented carbide and a coated cemented carbide each include a Zr carboxide. The cemented carbide includes a hard phase containing main component tungsten carbide and a binder phase containing at least one main component element selected from the group consisting of Co, Ni and Fe. The cemented carbide includes 75 to 95 mass % of the hard phase and 5 to 25 mass % of the binder phase in an inner region inner than 500 μm below a surface of the cemented carbide. The hard phase includes a Zr carboxide; and $Zr_{sur}/Zr_{in}$ is from 0.25 to 0.80 when an average content of the Zr carboxide in a surface region which ranges from the surface of the cemented carbide to a depth of 500 μm therebelow is denoted by $Zr_{sur}$ and an average content of the Zr carboxide in an inner region inner than the surface region is denoted by $Zr_{in}$.

20 Claims, No Drawings

CEMENTED CARBIDE AND COATED CEMENTED CARBIDE

TECHNICAL FIELD

The present invention relates to a cemented carbide and a coated cemented carbide.

BACKGROUND ART

There have been an increasing number of opportunities in which cutting is performed on difficult-to-machine materials, such as titanium alloys used for aircraft parts, etc., as well as nickel-based heat-resistant alloys and cobalt-based heat-resistant alloys used for turbine blades for electric generators. In the cutting of difficult-to-machine materials with low thermal conductivity, such as nickel-based heat-resistant alloys and cobalt-based heat-resistant alloys, the cutting temperature is prone to become high. In such high-temperature machining, the strength of the cutting edge of a cutting tool is reduced, thereby leading to the occurrence of fracturing, so that the tool life will be extremely short compared to that involved in the past machining of general steel. In view of this, in order to achieve the long life of a cutting tool even when cutting difficult-to-machine materials, there has been a need to enhance the high-temperature strength of the cutting tool.

For example, Patent Document 1 proposes a method of controlling, in a cemented carbide, an average particle size ratio between a carboxide containing Zr and a complex carbide containing Zr and W, and thereby improving the high-temperature strength of the cemented carbide.

CITATION LIST

Patent Documents

Patent Document 1: JP2009-074121 A

SUMMARY

Technical Problem

However, the cemented carbide disclosed in Patent Document 1 above has a problem in that, since the dispersed state of a carboxide containing Zr is not controlled, this leads to insufficient fracture resistance, thereby resulting in a short tool life.

The present invention has been made in order to solve the above problem, and an object of the present invention is to provide a cemented carbide and a coated cemented carbide each of which contains a Zr carboxide and which has fracture resistance.

Solution to Problem

The present inventor has conducted various studies regarding a cemented carbide and a coated cemented carbide. As a result, the present inventor has revealed that the devising of the structure of a cemented carbide makes it possible to obtain a cemented carbide which, although it contains a Zr carboxide, has fracture resistance, and this has led to the completion of the present invention.

Namely, the gist of the present invention is as set forth below:

(1) A cemented carbide comprising a hard phase containing tungsten carbide as its main component and a binder phase containing an element of at least one kind selected from the group consisting of Co, Ni and Fe as its main component, wherein: the cemented carbide comprises 75 mass % or more to 95 mass % or less of the hard phase and 5 mass % or more to 25 mass % or less of the binder phase in an inner region inner than a position of 500 μm in depth below a surface of the cemented carbide; the hard phase comprises a Zr carboxide; and $Zr_{sur}/Zr_{in}$ is from 0.25 or more to 0.80 or less, wherein an average content (volume %) of the Zr carboxide in a surface region which ranges from the surface of the cemented carbide to a depth of 500 μm therebelow is denoted by $Zr_{sur}$ and an average content (volume %) of the Zr carboxide in an inner region inner than the surface region is denoted by $Zr_{in}$.

(2) The cemented carbide of (1), wherein, in an inner region inner than a position of 500 μm in depth below the surface of the cemented carbide, a content of the Zr carboxide is from 0.05 mass % or more to 3.5 mass % or less based on the inner region in its entirety.

(3) The cemented carbide of (1) or (2), wherein: the binder phase comprises Co as its main component; and $Co_{sur}/Co_{in}$ is from 0.60 or more to 0.90 or less, wherein an average content (mass %) of Co in a region which ranges from the surface of the cemented carbide to a depth of 5 μm therebelow is denoted by $Co_{sur}$ and an average content (mass %) of Co in an inner region inner that a position of 5 μm in depth below the surface of the cemented carbide is denoted by $Co_{in}$.

(4) The cemented carbide of any of (1) to (3), wherein the hard phase further comprises a carbide, a nitride or a carbonitride of a metal element of at least one kind selected from the group consisting of Ti, Zr, Hf, V, Nb, Ta, Cr and Mo.

(5) A coated cemented carbide comprising a cemented carbide and a coating layer comprising a compound of a metal element of at least one kind selected from the group consisting of Ti, Zr, Hf, V, Nb, Ta, Cr, Mo, W, Al and Si, and a non-metal element of at least one kind selected from the group consisting of C, N, O and B, the coating layer being formed on the surface of the cemented carbide.

(6) The coated cemented carbide of (5), wherein the coating layer is a single layer or a laminate of two or more layers.

(7) The coated cemented carbide of (5) or (6), wherein an average thickness of the coating layer in its entirety is from 1.0 μm or more to 10 μm or less.

Advantageous Effects of Invention

The present invention can provide a cemented carbide and a coated cemented carbide each of which contains a Zr carboxide and has fracture resistance.

DESCRIPTION OF EMBODIMENTS

An embodiment for carrying out the present invention (hereinafter simply referred to as the "present embodiment") will hereinafter be described in detail. However, the present invention is not limited to the present embodiment below. Various modifications may be made to the present invention without departing from the gist of the invention.

The cemented carbide of the present embodiment is a cemented carbide including a hard phase containing tungsten carbide (WC) as its main component, and a binder phase. In an inner region which is inner than a position of 500 μm in depth below a surface of the cemented carbide, the ratio of the hard phase to the inner region in its entirety (100 mass %) is from 75 mass % or more to 95 mass % or less. Meanwhile, in the inner region which is inner than a position of 500 μm in depth below the surface of the cemented carbide, the ratio of the binder phase to the inner region in its entirety (100 mass %) is preferably from 5 mass % or more to 25 mass % or less, meaning that the binder phase occupies the parts of the inner region not occupied by the hard phase.

In the above region of the cemented carbide of the present embodiment, if the ratio of the hard phase is 75 mass % or more, this provides excellent wear resistance of the cemented carbide, and, if the ratio of the hard phase is 95 mass % or less, this provides improved fracture resistance of the cemented carbide and a greater amount of the binder phase serving as the remaining part, thereby resulting in increased sinterability of raw materials during the manufacture of a cemented carbide. In particular, from the same perspective, it is more preferable for the ratio of the hard phase to be from 86 mass % or more to 95 mass % or less and for the ratio of the binder phase to occupy the parts of the inner region not occupied by the hard phase.

The hard phase in the cemented carbide of the present embodiment contains tungsten carbide as its main component, and further contains a Zr carboxide. Herein, the term "main component" indicates that, when regarding the entire hard phase as constituting 100 mass %, such component constitutes over 50 mass %. When regarding the entire hard phase as constituting 100 mass %, the content of tungsten carbide in the hard phase is preferably 70 mass % or more and is more preferably 85 mass % or more. It is preferable for the hard phase in the cemented carbide of the present embodiment further to contain, in addition to tungsten carbide and a Zr carboxide, a carbide, a nitride or a carbonitride of a metal element of at least one kind selected from the group consisting of Ti, Zr, Hf, V, Nb, Ta, Cr and Mo, as this indicates the tendency of wear resistance and plastic-deformation resistance to be improved. From the same perspective, the above metal element is preferably a metal element of at least one kind selected from the group consisting of Ti, Ta and Cr, and is more preferably a carbide.

As to the hard phase in the cemented carbide of the present embodiment, the high-temperature strength is improved because it contains a Zr carboxide. Thus, a tool made of such cemented carbide is excellent in terms of fracture resistance in the machining of difficult-to-machine materials with low thermal conductivity. As the cemented carbide of the present embodiment, if $Zr_{sur}/Zr_{in}$ is from 0.25 or more to 0.80 or less when the average content (volume %) of a Zr carboxide in a surface region which ranges from the surface of the cemented carbide to a depth of 500 μm therebelow is denoted by $Zr_{sur}$ and the average content (mass %) of a Zr carboxide in an inner region inner than a position of 500 μm in depth below the surface of the cemented carbide (i.e., an inner region inner than the surface region) is denoted by $Zr_{in}$, this leads to improved fracture resistance. If $Zr_{sur}/Zr_{in}$ is 0.25 or more, this leads to improved fracture resistance, whereas, if $Zr_{sur}/Zr_{in}$ is 0.80 or less, this suppresses the increase in the number of pores, thereby leading to improved fracture resistance. From the same perspective, $Zr_{sur}/Zr_{in}$ is more preferably from 0.50 or more to 0.80 or less, and is further preferably from 0.60 or more to 0.80 or less.

In the inner region which is inner than a position of 500 μm in depth below the surface of the cemented carbide of the present embodiment, if the content of a Zr carboxide is 0.05 mass % or more based on the inner region in its entirety, this indicates the tendency of the high-temperature strength to be further improved. If such content of a Zr carboxide is 3.5 mass % or less, this prevents the Zr carboxide from becoming a starting point for destruction, thereby easily leading to improved fracture resistance. Thus, the content of the Zr carboxide is preferably from 0.05 mass % or more to 3.5 mass % or less, is more preferably from 0.10 mass % or more to 3.0 mass % or less, and is further preferably from 0.10 mass % or more to 2.0 mass % or less based on the inner region in its entirety.

The binder phase in the cemented carbide of the present embodiment includes a binder phase containing, as its main component, an element of at least one kind selected from the group consisting of Co, Ni and Fe. Herein, the term "main component" indicates that, when regarding the entire binder phase as constituting 100 mass %, such component constitutes over 50 mass %. When regarding the entire binder phase as constituting 100 mass %, the content of the above element in the binder phase is preferably 75 mass % or more, and is more preferably 90 mass % or more.

It is further preferable for the binder phase in the cemented carbide of the present embodiment to contain Co as its main component because this provides improved sinterability and also provides improved toughness of the cemented carbide, thereby leading to further excellent fracture resistance of the tool. As to the cemented carbide of the present embodiment, it is preferred if $Co_{sur}/Co_{in}$ is from 0.60 or more to 0.90 or less when the average content (mass %) of Co in a region which ranges from the surface of the cemented carbide to a depth of 5 μm therebelow is denoted by $Co_{sur}$ and the average content (mass %) of Co in an inner region inner than a position of 5 μm in depth below the surface of the cemented carbide is denoted by $Co_{in}$ as the amount of weld of chips can be further reduced when the cemented carbide is used as a material for a cutting tool. If $Co_{sur}/Co_{in}$ is 0.60 or more, this leads to increased toughness, thereby resulting in improved fracture resistance, whereas, if $Co_{sur}/Co_{in}$ is 0.90 or less, this indicates the tendency of the amount of weld of chips to be reduced, thereby resulting in improved fracture resistance.

The ratio between the hard phase and the binder phase in the inner region inner than a position of 500 μm in depth below the surface of the cemented carbide of the present embodiment, and the composition of each of the hard phase and the binder phase, are obtained as set forth below. A cross-sectional structure located within 500 μm in the depth direction below the surface of the cemented carbide is observed with a scanning electron microscope (SEM) provided with an energy-dispersive X-ray spectroscope (EDS), and the composition of each of the hard phase and the binder phase of the cemented carbide is measured with the EDS. The results can be used to obtain the ratio between the hard phase and the binder phase of the cemented carbide.

It should be noted, as set forth below, that the existence of the Zr carboxide in the cemented carbide of the present embodiment can be confirmed and that the content can be obtained. The cemented carbide is polished in a direction orthogonal to a surface thereof, the cross-sectional structure which has appeared via such polishing is observed with the SEM, the existence of the Zr carboxide can be confirmed using the EDS included with the SEM, and the content can be obtained. To be more specific, firstly, with regard to the content of the Zr carboxide in the inner region inner than a position of 500 μm in depth below the surface of the cemented carbide, a cross-sectional structure located within 500 μm in the depth direction below the surface of the cemented carbide is observed with the scanning electron microscope (SEM) provided with the energy-dispersive X-ray spectroscope (EDS), and the respective compositions of the hard phase and the binder phase of the cemented carbide are measured with the EDS. The results can be used to obtain the ratio between the hard phase and the binder phase of the cemented carbide. Further, as to $Zr_{sur}/Zr_{in}$, firstly, a cross-sectional structure of the cemented carbide which is magnified from 2,000 to 5,000 times using the SEM is observed via a backscattered electron image. With the EDS included with the SEM, it can be determined that: a white region refers to tungsten carbide; a dark gray region refers to a binder phase; and a black region refers to a Zr carboxide. Thereafter, a photograph is taken of a cross-sectional structure in a region which ranges from the surface of the cemented carbide to a position 500 μm in the depth direction therebelow. From the obtained photograph of the cross-sectional structure, it is possible to obtain the content (volume %) of the Zr carboxide in the region which ranges from the surface of the cemented carbide to a depth of 500 μm therebelow, using commercially available image analysis software. As to the cemented carbide, the content (volume %) of the Zr carboxide in the region which ranges from the surface to a depth of 500 μm therebelow is obtained at each of at least three locations, and the average value is regarded as being denoted by an average content $Zr_{sur}$. Then, as to the cemented carbide, the content (volume %) of the Zr carboxide located within 500 μm in the depth direction below the surface in the depth direction is obtained at each of at least five locations, and the average value of the obtained values is regarded as being denoted by an average content $Zr_{in}$. $Zr_{sur}/Zr_{in}$ is then obtained.

$Co_{sur}/Co_{in}$ in the cemented carbide of the present embodiment can be obtained as set forth below. The cemented carbide is polished in a direction orthogonal to a surface thereof, the cross-sectional structure which has appeared via such polishing is observed with the SEM, and, using the EDS included with the SEM, $Co_{sur}/Co_{in}$ can be obtained. More specifically, as to the cemented carbide, the Co content in the region which ranges from the surface to a depth of 5 μm therebelow is measured at each of ten locations, and the average value is regarded as being denoted by an average content $Co_{sur}$. Further, as to the cemented carbide, the Co content in the inner region inner than a position of 500 μm in depth below the surface is measured at each of ten locations, and the average value is regarded as being denoted by an average content $Co_{in}$. $Co_{sur}/Co_{in}$ is then obtained.

The coated cemented carbide of the present embodiment includes the above-described cemented carbide and a coating layer formed on a surface of the cemented carbide. Such coated cemented carbide has further improved wear resistance. The coating layer according to the present embodiment may be a single layer or a laminate of two or more layers. If the average thickness of the entire coating layer according to the present embodiment is 1.0 μm or more, this leads to improved wear resistance, whereas, if such average thickness is 10 μm or less, this leads to improved fracture resistance. From such perspective, the average thickness of the entire coating layer is preferably from 1.0 μm or more to 10 μm or less, is more preferably from 1.5 μm or more to 8.0 μm or less, and is further preferably from 2.5 μm or more to 6.0 μm or less.

The coating layer according to the present embodiment is not particularly limited, as long as it can be used as a coating layer of a coated tool. In particular, the coating layer is preferably a compound layer of a metal element of at least one kind selected from the group consisting of Ti, Zr, Hf, V, Nb, Ta, Cr, Mo, W, Al and Si, and a non-metal element of at least one kind selected from the group consisting of C, N, O and B, as this will lead to improved wear resistance. From the same perspective, the coating layer is more preferably a compound layer of a metal element of at least one kind selected from the group consisting of Ti, Zr, Hf, V, Nb, Ta, Cr, Mo, W, Al and Si, and an N element.

The thickness of each layer which constitutes the coating layer and the thickness of the entire coating layer according to the present embodiment can be measured from a cross-sectional structure of the coated cemented carbide, using an optical microscope, a SEM, a transmission electron microscope (TEM), or the like. It should be noted that, as to the average thickness of each layer and the average thickness of the entire coating layer in the coated cemented carbide of the present embodiment, such average thicknesses can be obtained by measuring the thickness of each layer and the thickness of the entire coating layer, from each of the cross-sectional surfaces at three or more locations, and calculating the average value of the resulting measurements.

The composition of each layer which constitutes the coating layer in the coated cemented carbide of the present embodiment can be determined, from a cross-sectional structure of the coated cemented carbide of the present embodiment, via measurements with an EDS, a wavelength-dispersive X-ray spectroscope (WDS), or the like.

The coating layer according to the present embodiment may be formed by a chemical vapor deposition method or by a physical vapor deposition method. In particular, the coating layer is preferably formed by the physical vapor deposition method. Examples of such physical vapor deposition method include an arc ion plating method, an ion plating method, a sputtering method and an ion mixing method. In particular, the arc ion plating method is preferable as further excellent adhesion can be achieved between the cemented carbide and the coating layer.

A method of manufacturing a cemented carbide or a coated cemented carbide according to the present embodiment will now be described using specific examples. It should be noted that the method of manufacturing a cemented carbide or a coated cemented carbide according to the present embodiment is not particularly limited, as long as the configurations of the cemented carbide may be achieved.

For instance, the method of manufacturing a cemented carbide or a coated cemented carbide according to the present embodiment may include steps (A) to (K) set forth below.

Step (A): a step of: holding a Zr carbide powder with an average particle size of 0.5 μm or more to 5.0 μm or less in an oxygen atmosphere with a pressure of 0.02 kPa or higher to 2.0 kPa or lower and at a temperature of 400° C. or higher to 700° C. or lower; heating such Zr carbide powder for 5 minutes or more to 60 minutes or less: and then causing oxygen to be adsorbed over the Zr carbide.

Step (B): a step of formulating: 67.0 mass % to 95.0 mass % of a tungsten carbide powder with an average particle size of 0.5 μm or more to 5.0 μm or less; 0.05 mass % to 4.0 mass % of the Zr carbide powder with an average particle size of 0.5 μm or more to 5.0 μm or less which has undergone step (A) above; 5.0 mass % to 25.0 mass % of a metal powder of at least one kind selected from the group consisting of Co, Ni and Fe with an average particle size of 0.5 μm or more to 3.0 μm or less; and optionally 0 mass % to 5.0 mass % of a carbide, nitride or carbonitride powder of at least one kind selected from the group consisting of Ti, Zr, Hf, V, Nb, Ta, Cr and Mo with an average particle size of 0.5 μm or more to 5.0 μm or less (the total should be 100 mass %), and thereby obtaining formulated powders.

Step (C): a mixing step of mixing the formulated powders prepared in step (B) together with a solvent by means of a wet ball mill for 10 hours to 40 hours so as to obtain a mixture.

Step (D): a step of heating and drying the mixture obtained in step (C) at 100° C. or lower while evaporating the solvent so as to obtain a dried mixture.

Step (E): a molding step of adding 1.5 mass % of a paraffin wax to the dried mixture obtained in step (D) and molding the resultant product into a predetermined tool shape so as to obtain a molded body.

Step (F): a first temperature raising step of raising the temperature of the molded body obtained in step (E) so as to reach a temperature of 1,200° C. or higher to 1,400° C. or lower under a vacuum condition of 70 Pa or lower.

Step (G): a holding step of holding the molded body which has undergone step (F) at a temperature of 1,200° C. or higher to 1,400° C. or lower and heating such molded body for 30 minutes or more to 120 minutes or less in a carbon monoxide atmosphere with a pressure of 50 Pa or higher to 1,330 Pa or lower.

Step (H): a second temperature raising step of raising the temperature of the molded body which has undergone step (G) so as to reach a temperature of 1,400° C. or higher to 1,600° C. or lower in an inert gas atmosphere with a pressure of 50 Pa or higher to 1,330 Pa or lower.

Step (I): a sintering step of holding the molded body which has undergone step (H) at a temperature of 1,400° C. or higher to 1,600° C. or lower and sintering such molded body for 30 minutes to 120 minutes in an inert gas atmosphere with a pressure of 50 Pa or higher to 1,330 Pa or lower.

Step (J): a first cooling step of cooling the molded body which has undergone step (I) from a temperature of 1,400° C. or higher to 1,600° C. or lower to a temperature of 1,200° C. at a rate of 50° C./min or higher to 100° C./min or lower in an inert gas atmosphere with a pressure of 100 kPa or higher to 500 kPa or lower.

Step (K): a second cooling step of cooling the molded body which has undergone step (J) from a temperature of 1,200° C. to normal temperature in an inert gas atmosphere at an atmospheric pressure.

It should be noted that the average particle sizes of the raw material powders used in steps (A) and (B) were measured by the Fisher method (Fisher Sub-Sieve Sizer (FSSS)) indicated in standard B330 of the American Society for Testing and Materials (ASTM).

Steps (A) to (K) each have the respective meanings set forth below.

In step (A), a Zr carbide powder is oxidized under predetermined conditions, whereby oxygen diffuses over the Zr carbide. After step (A), oxygen has not diffused into the Zr carbide, and thus, for the purposes of description, the term Zr carbide is used. It should be noted that, if the temperature or pressure is higher than that of predetermined conditions, zirconium oxide is generated.

In step (B), a tungsten carbide powder, a metal powder of at least one kind selected from the group consisting of Co, Ni and Fe, the Zr carbide powder which has undergone step (A) above and, optionally, a carbide, nitride or carbonitride powder of at least one kind selected from the group consisting of Ti, Zr, Hf, V, Nb, Ta, Cr and Mo, are used at predetermined formulation ratios, thereby making it possible to adjust the composition of the cemented carbide so as to fall within a specific range.

In step (C), the average particle size of the hard phase can be adjusted. Further, in step (C), it is possible to obtain a mixture by uniformly mixing the raw material powders prepared in step (B).

In step (D), the mixture is heated and dried, thereby making it possible to obtain a dried mixture in which the solvent has been evaporated.

In step (E), a paraffin wax is added to the dried mixture, and the resultant product is molded into a predetermined tool shape. The addition of paraffin allows the moldability to be improved. The obtained molded body is sintered in the sintering step below (step (I)).

In step (F), the temperature of the molded body is raised in a vacuum of 70 Pa or lower. This promotes degassing of the molded body before the appearance of a liquid phase and right after the appearance of a liquid phase and also improves the sinterability in the sintering step below (step (I)). Further, in the process during which the temperature is raised, the oxygen which has diffused over the Zr carbide diffuses into the Zr carbide, thereby making it possible to obtain a Zr carboxide.

In step (G), the molded body is held at a temperature of 1,200° C. or higher to 1,400° C. or lower in a carbon monoxide atmosphere. This causes a reaction between carbon monoxide and the oxygen in a Co, Ni or Fe oxide in a surface region of the molded body, so that the oxygen concentration in the surface region is reduced. Such reaction causes the Zr carboxide to be dissolved in Co, Ni or Fe and oxygen to be supplied in the surface region, and also causes the Zr concentration in Co, Ni or Fe to be increased. As a result, Zr diffuses into the inner region, and the concentration of the Zr carboxide in each of the surface region and the inner region can be controlled. It should be noted that the Zr carboxide is deposited during cooling in step (K) described below.

In step (H), the temperature of the molded body is raised to a temperature of 1,400° C. or higher to 1,600° C. or lower in an inert gas atmosphere.

In step (I), the molded body is sintered at a temperature of 1,400° C. or higher to 1,600° C. or lower in an inert gas atmosphere. As a result, the molded body becomes dense, and the mechanical strength of the molded body is enhanced. Further, in step (I), the Zr carboxide dissolved in Co, Ni or Fe diffuses into the inner region and is deposited, and thus, $Zr_{sur}/Zr_{in}$ can be controlled. Moreover, Co, Ni or Fe near the surface of the molded body is evaporated, whereby the concentration of Co, Ni or Fe near the surface is reduced.

In step (J), the molded body is rapidly cooled from a temperature of 1,400° C. or higher to 1,600° C. or lower to a temperature of 1,200° C. at a rate of 5° C./min or higher to 30° C./min or lower in an inert gas atmosphere with a pressure of 100 kPa or higher to 500 kPa or lower. This can prevent Co, Ni or Fe from leaching from the inside of the molded body to the region near the surface. $Co_{sur}/Co_{in}$ can be controlled by combining the conditions of step (I) with those of step (J).

In step (K), the molded body is cooled from a temperature of 1,200° C. to normal temperature in an inert gas atmosphere at an atmospheric pressure, so that a cemented carbide is obtained. This can prevent the cemented carbide from being oxidized.

Grinding and edge honing may be performed, as necessary, on the cemented carbide which has undergone steps (A) to (K).

A method of manufacturing a coated cemented carbide according to the present embodiment will now be described using specific examples. It should be noted that the method of manufacturing a coated cemented carbide according to the present embodiment is not particularly limited, as long as the configurations of the coated cemented carbide may be achieved.

The cemented carbide of the present embodiment processed in a tool shape is received in a reactor of a physical vapor deposition apparatus, and the reactor is evacuated until the pressure therein indicates a vacuum of $1\times10^{-2}$ Pa or lower. After the evacuation, the cemented carbide is heated, by a heater in the reactor, until the temperature becomes 200° C. or higher to 800° C. or lower. After the heating, an Ar gas is introduced into the reactor so that the pressure in the reactor is 0.5 Pa or higher to 5.0 Pa or lower. In the Ar gas atmosphere with a pressure of 0.5 Pa or higher to 5.0 Pa or lower, a bias voltage of −1,000 V or higher to −200 V or lower is applied to the cemented carbide, and a current of 5 A or higher to 20 A or lower is caused to flow through a tungsten filament in the reactor, whereby an ion bombardment process is carried out, with the Ar gas, on a surface of the cemented carbide. After the ion bombardment process is carried out on the surface of the cemented carbide, the reactor is evacuated until the pressure therein indicates a vacuum of $1\times10^{-2}$ Pa or lower.

Then, the cemented carbide is heated until the temperature becomes 200° C. or higher to 600° C. or lower. Thereafter, a reaction gas such as a nitrogen gas is introduced in the reactor, and the pressure in the reactor is set to from 0.5 Pa or higher to 5.0 Pa or lower. Then, a bias voltage of −150 V or higher to −10 V or lower is applied to the cemented carbide, and a metal evaporation source according to the metal components of a coating layer is evaporated via an arc discharge of 80 A or higher to 150 A or lower, whereby the coating layer is formed on the surface of the cemented carbide. As a result, a coated cemented carbide is obtained.

The cemented carbide and the coated cemented carbide of the present embodiment each have excellent machining performance, particularly in the machining of difficult-to-machine materials, and can therefore be suitably used as a constituent material for a tool. When the cemented carbide and the coated cemented carbide of the present embodiment are each used as a constituent material for, for example, a cutting tool, they each have excellent performance particularly on the cutting of difficult-to-machine materials. Further, when the cemented carbide and the coated cemented carbide of the present embodiment are each used as a material for a tool for machining difficult-to-machine materials with low thermal conductivity (e.g., a cutting tool), they are each especially useful with respect to the point of having excellent high-temperature strength and fracture resistance.

EXAMPLES

Example 1

[Manufacture of Cemented Carbide]

As raw material powders, a tungsten carbide powder with an average particle size of 1.5 µm, a Zr carbide (hereinafter referred to as "ZrC") powder with an average particle size of 3.0 µm, a TiC powder with an average particle size of 3.0 µm, a TaC powder with an average particle size of 3.0 µm, a $Cr_3C_2$ powder with an average particle size of 3.0 µm, and a Co powder with an average particle size of 1.5 µm were prepared. The average particle sizes of the raw material powders were measured by the Fisher method (Fisher Sub-Sieve Sizer (FSSS)) indicated in standard B330 of the American Society for Testing and Materials (ASTM).

As to invention samples 1 to 17 and comparative samples 2, 3, 5, 6, 8, 9, 11 and 13, after the prepared ZrC powder is received in a furnace in which an oxygen atmosphere can be kept under control, the temperature was raised from room temperature to 500° C. in a vacuum of 70 Pa or lower. After the furnace temperature reached 500° C., oxygen was introduced into the furnace until the pressure therein became 0.5 kPa. ZrC was subjected to oxidation in an oxidation atmosphere with a furnace pressure of 0.5 kPa. As a result, a ZrC powder over which oxygen had diffused was obtained.

The prepared raw material powders were weighed so as to achieve the formulation compositions shown in Table 1, and the weighed raw material powders were received in a stainless steel pot, together with an acetone solvent and a cemented carbide ball, where mixing and crushing were performed with a wet ball mill for 5 hours to 40 hours. At this time, as to invention samples 1 to 17 and comparative samples 2, 3, 5, 6, 8, 9, 11 and 13, a ZrC powder which had undergone an oxidation process was used. As to comparative sample 12, a ZrC powder which had not undergone an oxidation process was used. After the mixing and crushing with the wet ball mill, 1.5 mass % of a paraffin wax was added to the dried mixture obtained via evaporation of the acetone solvent, the resultant product was press molded at a pressure of 196 MPa, using a mold which allowed the post-sintering shape to match an ISO standard insert shape CNMG120408, and a molded body of the mixture was then obtained.

TABLE 1

| Sample No. | Formulation composition (mass %) |
|---|---|
| Invention sample 1 | 94.85% WC, 0.05% ZrC*, 5.1% Co |
| Invention sample 2 | 94.55% WC, 0.05% ZrC*, 0.3% $Cr_3C_2$, 5.1% Co |
| Invention sample 3 | 92.9% WC, 1.7% ZrC*, 0.3% $Cr_3C_2$, 5.1% Co |
| Invention sample 4 | 92.9% WC, 1.7% ZrC*, 0.3% $Cr_3C_2$, 5.1% Co |
| Invention sample 5 | 92.9% WC, 1.7% ZrC*, 0.3% $Cr_3C_2$, 5.1% Co |
| Invention sample 6 | 92.9% WC, 2.6% ZrC*, 0.3% $Cr_3C_2$, 5.1% Co |
| Invention sample 7 | 92.9% WC, 2.6% ZrC*, 0.3% $Cr_3C_2$, 5.1% Co |
| Invention sample 8 | 86.05% WC, 1.7% ZrC*, 0.6% $Cr_3C_2$, 1.5% TiC, 10.15% Co |
| Invention sample 9 | 86.65% WC, 2.6% ZrC*, 0.6% $Cr_3C_2$, 10.15% Co |
| Invention sample 10 | 86.65% WC, 2.6% ZrC*, 0.6% $Cr_3C_2$, 10.15% Co |
| Invention sample 11 | 85.75% WC, 3.5% ZrC*, 0.6% $Cr_3C_2$, 10.15% Co |
| Invention sample 12 | 80.7% WC, 1.7% ZrC*, 0.9% $Cr_3C_2$, 1.5% TaC, 15.2% Co |
| Invention sample 13 | 80.4% WC, 3.5% ZrC*, 0.9% $Cr_3C_2$, 15.2% Co |
| Invention sample 14 | 80.4% WC, 3.5% ZrC*, 0.9% $Cr_3C_2$, 15.2% Co |
| Invention sample 15 | 67.6% WC, 2.6% ZrC*, 1.5% $Cr_3C_2$, 1.5% TiC, 1.5% TaC, 25.3% Co |
| Invention sample 16 | 69.2% WC, 4% ZrC*, 1.5% $Cr_3C_2$, 25.3% Co |
| Invention sample 17 | 69.7% WC, 3.5% ZrC*, 1.5% $Cr_3C_2$, 25.3% Co |
| Comparative sample 1 | 94.9% WC, 5.1% Co |

TABLE 1-continued

| Sample No. | Formulation composition (mass %) |
|---|---|
| Comparative sample 2 | 97.9% WC, 0.05% ZrC*, 2.05% Co |
| Comparative sample 3 | 92% WC, 2.6% ZrC*, 0.3% $Cr_3C_2$, 5.1% Co |
| Comparative sample 4 | 88.05% WC, 0.3% $Cr_3C_2$, 1.5% TiC, 10.15% Co |
| Comparative sample 5 | 86.95% WC, 2.6% ZrC*, 0.3% $Cr_3C_2$, 10.15% Co |
| Comparative sample 6 | 86.95% WC, 2.6% ZrC*, 0.3% $Cr_3C_2$, 10.15% Co |
| Comparative sample 7 | 82.4% WC, 0.9% $Cr_3C_2$, 1.5% TiC, 15.2% Co |
| Comparative sample 8 | 80.4% WC, 3.5% ZrC*, 0.9% $Cr_3C_2$, 15.2% Co |
| Comparative sample 9 | 80.4% WC, 3.5% ZrC*, 0.9% $Cr_3C_2$, 15.2% Co |
| Comparative sample 10 | 70.2% WC, 1.5% $Cr_3C_2$, 1.5% TiC, 1.5% TaC, 25.3% Co |
| Comparative sample 11 | 69.7% WC, 3.5% ZrC*, 1.5% $Cr_3C_2$, 25.3% Co |
| Comparative sample 12 | 69.7% WC, 3.5% ZrC*, 1.5% $Cr_3C_2$, 25.3% Co |
| Comparative sample 13 | 64.08% WC, 4% ZrC*, 1.6% $Cr_3C_2$, 1.5% TiC, 1.5% TaC, 27.32% Co |
| Comparative sample 14 | 83.9% WC, 0.9% $Cr_3C_2$, 15.2% Co |

*"ZrC*" in the "formulation composition" column refers to ZrC over which oxygen has diffused because ZrC has undergone an oxidation process. (It should be noted, however, that oxygen has not diffused into the ZrC.)

After the molded body of the mixture was received in a sintering furnace, the temperature was raised from room temperature to a target raised temperature T1 (° C.) as indicated in column (a) of Table 2 below in a vacuum of 70 Pa or lower. After the furnace temperature reached the target raised temperature T1 (° C.), a carbon monoxide gas was introduced into the sintering furnace until the furnace pressure became a furnace pressure P1 (Pa) as indicated in column (b) of Table 2. The molded body was held for 60 minutes in a carbon monoxide atmosphere at the target raised temperature T1 and the furnace pressure P1. Thereafter, the carbon monoxide gas was exhausted, and an argon gas was introduced into the furnace until the furnace pressure became a furnace pressure P2 (Pa) as indicated in column (c) of Table 2, whereby the carbon monoxide gas was substituted with the argon gas. After the substitution to the argon gas atmosphere, the furnace temperature was raised to a sintering temperature T2 (° C.) as indicated in column (d) of Table 2, and the molded body was held at the temperature T2 (° C.) for 60 minutes. As a result, the sintering of the molded body was performed. After the sintering, an argon gas was introduced for pressurization until the furnace pressure became a furnace pressure P3 (kPa) as indicated in column (e) of Table 2, and the molded body was cooled from the sintering temperature T2 (° C.) to 1,200° C. at a cooling rate R (° C./min) as indicated in column (f) of Table 2.

TABLE 2

| Sample No. | (a) Target raised temperature T1(° C.) | (b) Furnace pressure P1(kPa) | (c) Furnace pressure P2(kPa) | (d) Sintering temperature T2(° C.) | (e) Furnace pressure P3(kPa) | (f) Cooling rate R(° C./min.) |
|---|---|---|---|---|---|---|
| Invention sample 1 | 1,400 | 300 | 300 | 1,450 | 200 | 50 |
| Invention sample 2 | 1,400 | 300 | 300 | 1,450 | 500 | 50 |
| Invention sample 3 | 1,400 | 500 | 500 | 1,450 | 800 | 50 |
| Invention sample 4 | 1,400 | 700 | 500 | 1,450 | 200 | 50 |
| Invention sample 5 | 1,400 | 900 | 500 | 1,450 | 200 | 50 |
| Invention sample 6 | 1,400 | 700 | 300 | 1,450 | 200 | 50 |
| Invention sample 7 | 1,400 | 1,300 | 300 | 1,450 | 200 | 50 |
| Invention sample 8 | 1,350 | 250 | 1,300 | 1,500 | 200 | 65 |
| Invention sample 9 | 1,350 | 500 | 1,300 | 1,500 | 200 | 65 |
| Invention sample 10 | 1,350 | 900 | 300 | 1,500 | 200 | 65 |
| Invention sample 11 | 1,350 | 900 | 300 | 1,500 | 200 | 65 |
| Invention sample 12 | 1,300 | 200 | 300 | 1,550 | 200 | 75 |
| Invention sample 13 | 1,300 | 700 | 300 | 1,550 | 200 | 75 |
| Invention sample 14 | 1,300 | 1,200 | 300 | 1,550 | 200 | 75 |
| Invention sample 15 | 1,200 | 300 | 1,000 | 1,600 | 200 | 100 |
| Invention sample 16 | 1,200 | 700 | 1,000 | 1,600 | 200 | 100 |

TABLE 2-continued

| Sample No. | (a) Target raised temperature T1(° C.) | (b) Furnace pressure P1(kPa) | (c) Furnace pressure P2(kPa) | (d) Sintering temperature T2(° C.) | (e) Furnace pressure P3(kPa) | (f) Cooling rate R(° C./min.) |
|---|---|---|---|---|---|---|
| Invention sample 17 | 1,200 | 1,100 | 1,000 | 1,600 | 200 | 100 |
| Comparative sample 1 | 1,400 | 300 | 300 | 1,450 | 200 | 50 |
| Comparative sample 2 | 1,400 | 1,300 | 300 | 1,450 | 200 | 50 |
| Comparative sample 3 | 1,400 | 100 | 300 | 1,450 | 200 | 50 |
| Comparative sample 4 | 1,350 | 250 | 300 | 1,500 | 200 | 65 |
| Comparative sample 5 | 1,350 | 50 | 300 | 1,500 | 200 | 65 |
| Comparative sample 6 | 1,350 | 1,330 | 300 | 1,500 | 200 | 65 |
| Comparative sample 7 | 1,300 | 200 | 300 | 1,550 | 200 | 75 |
| Comparative sample 8 | 1,300 | 500 | 300 | 1,550 | 200 | 75 |
| Comparative sample 9 | 1,300 | 1,330 | 300 | 1,550 | 200 | 75 |
| Comparative sample 10 | 1,200 | 1,300 | 300 | 1,600 | 200 | 100 |
| Comparative sample 11 | 1,200 | 100 | 300 | 1,600 | 200 | 100 |
| Comparative sample 12 | 1,200 | 1,330 | 300 | 1,600 | 200 | 100 |
| Comparative sample 13 | 1,200 | 700 | 300 | 1,600 | 200 | 100 |
| Comparative sample 14 | 1,300 | 1,300 | 300 | 1,600 | 200 | 50 |

A cemented carbide could be obtained by sintering the molded body of the mixture, as described above. Using a wet brush honing machine, honing was performed on the edge of the obtained cemented carbide.

[Formation of Coating Layer]

A metal evaporation source was placed in a reactor of an arc ion plating apparatus. The composition of the metal evaporation source was Ti:Al=50:50 (atomic ratio). The cemented carbide made as described above was attached to a holder in the reactor of the arc ion plating apparatus. The pressure in the reactor was evacuated so as to be a vacuum of $1 \times 10^{-2}$ Pa or lower. The cemented carbide was heated to 500° C. by a furnace heater. After the temperature of the cemented carbide reached 500° C., an Ar gas was introduced in the reactor until the pressure in the reactor became 5 Pa. A bias voltage of −1,000 V was applied to the cemented carbide in the reactor, whereby an Ar ion bombardment process was performed on the surface of the cemented carbide. The ion bombardment conditions were as set forth below.

Atmosphere in the reactor: Ar atmosphere
Pressure in the reactor: 5 Pa

After the Ar ion bombardment process, the Ar gas was exhausted such that the pressure in the reactor became a vacuum of $1 \times 10^{-2}$ Pa or lower. Thereafter, an $N_2$ gas was introduced into the reactor so as to achieve a nitrogen atmosphere with a pressure of 3 Pa in the reactor. Next, the cemented carbide was heated to 600° C. by means of the furnace heater. After the heating of the cemented carbide, a bias voltage of −50 V is applied to the cemented carbide, and a metal evaporation source was evaporated via an arc discharge of 150 A. Thus, a coating layer was formed on the surface of the cemented carbide. After the formation of the coating layer, the sample was cooled. The sample was taken out of the reactor after the temperature of the sample reached 100° C. or lower.

The obtained sample (cutting tool comprised of a coated cemented carbide) was mirror-polished in a direction orthogonal to a surface thereof.

A surface which appeared via the above mirror polishing (hereinafter referred to as a "mirror-polished surface") was observed near the position 50 μm from the edge of a surface facing the metal evaporation source, toward the center of such surface. An optical microscope and an FE-SEM were used for the observation of a mirror-polished surface. The thickness of the coating layer was measured at three locations from an image of the observed mirror-polished surface. The average value of the measured thicknesses of the coating layer was calculated. The composition of the coating layer was measured using an EDS attached to an FE-SEM and a WDS attached to an FE-SEM. The composition of the coating layer of any of the samples was $(Ti_{0.5}Al_{0.5})N$. Further, the average thickness of the entire coating layer of any of the samples was 3.0 μm.

Each of the obtained samples was mirror-polished in a direction perpendicular to a surface thereof. As to the mirror-polished surface, an observation was conducted, with the SEM including an EDS, on a cross-sectional (a mirror-polished surface) structure located within 500 μm in the depth direction below the surface of the cemented carbide (the interface between the coating layer and the cemented carbide in the coating cemented carbide) in the depth direction.

Each composition of the hard phase and the binder phase of the cemented carbide in the coated cemented carbide was measured using the EDS. The results were used to obtain a ratio between the hard phase and the binder phase of the cemented carbide. The results are shown in Table 3.

TABLE 3

| | Cemented carbide | | | | | | |
|---|---|---|---|---|---|---|---|
| | Hard phase | | | | | Binder phase | |
| | WC | Zr carboxide | Compound | | Entire hard phase | | |
| Sample No. | (mass %) | (mass %) | Composition | (mass %) | (mass %) | Composition | (mass %) |
| Invention sample 1 | 94.95 | 0.05 | — | 0 | 95 | Co | 5 |
| Invention sample 2 | 94.65 | 0.05 | $Cr_3C_2$ | 0.3 | 95 | Co | 5 |
| Invention sample 3 | 93 | 1.7 | $Cr_3C_2$ | 0.3 | 95 | Co | 5 |
| Invention sample 4 | 93 | 1.7 | $Cr_3C_2$ | 0.3 | 95 | Co | 5 |
| Invention sample 5 | 93 | 1.7 | $Cr_3C_2$ | 0.3 | 95 | Co | 5 |
| Invention sample 6 | 92.1 | 2.6 | $Cr_3C_2$ | 0.3 | 95 | Co | 5 |
| Invention sample 7 | 92.1 | 2.6 | $Cr_3C_2$ | 0.3 | 95 | Co | 5 |
| Invention sample 8 | 86.2 | 1.7 | $Cr_3C_2$, TiC | 0.6, 1.5 | 90 | Co | 10 |
| Invention sample 9 | 86.79 | 2.6 | $Cr_3C_2$ | 0.6 | 90 | Co | 10 |
| Invention sample 10 | 86.79 | 2.6 | $Cr_3C_2$ | 0.6 | 90 | Co | 10 |
| Invention sample 11 | 85.89 | 3.51 | $Cr_3C_2$ | 0.6 | 90 | Co | 10 |
| Invention sample 12 | 80.9 | 1.7 | $Cr_3C_2$, TaC | 0.9, 1.5 | 85 | Co | 15 |
| Invention sample 13 | 80.59 | 3.51 | $Cr_3C_2$ | 0.9 | 85 | Co | 15 |
| Invention sample 14 | 80.59 | 3.51 | $Cr_3C_2$ | 0.9 | 85 | Co | 15 |
| Invention sample 15 | 67.86 | 2.61 | $Cr_3C_2$, TiC, TaC | 1.51, 1.51, 1.51 | 75 | Co | 25 |
| Invention sample 16 | 69.48 | 4.01 | $Cr_3C_2$ | 1.51 | 75 | Co | 25 |
| Invention sample 17 | 69.98 | 3.51 | $Cr_3C_2$ | 1.51 | 75 | Co | 25 |
| Comparative sample 1 | 95 | 0 | — | 0 | 95 | Co | 5 |
| Comparative sample 2 | 97.95 | 0.05 | — | 0 | 98 | Co | 2 |
| Comparative sample 3 | 92.1 | 2.6 | $Cr_3C_2$ | 0.3 | 95 | Co | 5 |
| Comparative sample 4 | 88.2 | 0 | $Cr_3C_2$, TiC | 0.3, 1.5 | 90 | Co | 10 |
| Comparative sample 5 | 87.1 | 2.6 | $Cr_3C_2$ | 0.3 | 90 | Co | 10 |
| Comparative sample 6 | 87.1 | 2.6 | $Cr_3C_2$ | 0.3 | 90 | Co | 10 |
| Comparative sample 7 | 82.6 | 0 | $Cr_3C_2$, TaC | 0.9, 1.5 | 85 | Co | 15 |
| Comparative sample 8 | 80.59 | 3.51 | $Cr_3C_2$ | 0.9 | 85 | Co | 15 |
| Comparative sample 9 | 80.59 | 3.51 | $Cr_3C_2$ | 0.9 | 85 | Co | 15 |
| Comparative sample 10 | 70.47 | 0 | $Cr_3C_2$, TiC, TaC | 1.51, 1.51, 1.51 | 75 | Co | 25 |
| Comparative sample 11 | 69.98 | 3.51 | $Cr_3C_2$ | 1.51 | 75 | Co | 25 |
| Comparative sample 12 | 69.98 | 0 | ZrC, $Cr_3C_2$ | 3.51, 1.51 | 75 | Co | 25 |
| Comparative sample 13 | 64.35 | 4.02 | $Cr_3C_2$, TiC, TaC | 1.61, 1.51, 1.51 | 73 | Co | 27 |
| Comparative sample 14 | 84.1 | 0 | $Cr_3C_2$ | 0.9 | 85 | Co | 15 |

The coated cemented carbide was polished in a direction orthogonal to a surface thereof. A cross-sectional (a surface which appeared via polishing) structure of the coated cemented carbide which was magnified 3,000 times using the SEM including an EDS was observed via a backscattered electron image. It was determined that: the white region refers to tungsten carbide; the dark gray region refers to a binder phase; and the black region refers to a Zr carboxide. Thereafter, a photograph was taken of a cross-sectional structure of a region which ranged from the surface of the cemented carbide (the interface between the coating layer and the cemented carbide in the coated cemented carbide) to a depth of 500 μm therebelow. From the obtained photograph of the cross-sectional structure, the content (volume %) of the Zr carboxide in the region which ranged from the surface of the cemented carbide (the interface between the coating layer and the cemented carbide in the coated cemented carbide) to a depth of 500 μm therebelow was obtained, using commercially available image analysis software. With the same method, the content (volume %) of the Zr carboxide in the region which ranged from the surface of the cemented carbide (the interface between the coating layer and the cemented carbide in the coated cemented carbide) to a depth of 500 μm therebelow was obtained at each of at least three locations, and the average value was denoted by $Zr_{sur}$. Then, the content (volume %) of the Zr carboxide located inner than a position of 500 μm in depth below the surface of the cemented carbide (the interface between the coating layer and the cemented carbide in the coated cemented carbide) was obtained at each of at least five locations, and the average value of the obtained values was denoted by $Zr_{in}$. The results were used to obtain $Zr_{sur}/Zr_{in}$, and the results are shown in Table 4.

Subsequently, a cross-sectional structure which appeared via the polishing of the surface of the cemented carbide in a direction orthogonal thereto was observed with the SEM including an EDS. The Co content (mass %) in the region which ranged from the surface of the cemented carbide (the interface between the coating layer and the cemented carbide in the coated cemented carbide) to a depth of 5 μm therebelow was measured at each of ten locations, and the average value was denoted by $Co_{sur}$. Further, the Co content (mass %) in the inner region inner than a position of 5 μm in depth below the surface of the cemented carbide (the interface between the coating layer and the cemented carbide in the coated cemented carbide) was measured at each of ten arbitrary locations, and the average value was denoted by $Co_{in}$. The results were used to obtain $Co_{sur}/Co_{in}$, and the results are shown in Table 4.

TABLE 4

| Sample No. | $Zr_{sur}/Zr_{in}$ | $Co_{sur}/Co_{in}$ |
| --- | --- | --- |
| Invention sample 1 | 0.78 | 0.53 |
| Invention sample 2 | 0.79 | 0.68 |
| Invention sample 3 | 0.76 | 0.66 |
| Invention sample 4 | 0.55 | 0.72 |
| Invention sample 5 | 0.33 | 0.67 |
| Invention sample 6 | 0.76 | 0.62 |
| Invention sample 7 | 0.29 | 0.68 |
| Invention sample 8 | 0.73 | 0.72 |
| Invention sample 9 | 0.74 | 0.68 |
| Invention sample 10 | 0.25 | 0.73 |
| Invention sample 11 | 0.59 | 0.74 |
| Invention sample 12 | 0.73 | 0.79 |
| Invention sample 13 | 0.77 | 0.80 |
| Invention sample 14 | 0.31 | 0.75 |
| Invention sample 15 | 0.68 | 0.88 |

TABLE 4-continued

| Sample No. | $Zr_{sur}/Zr_{in}$ | $Co_{sur}/Co_{in}$ |
| --- | --- | --- |
| Invention sample 16 | 0.79 | 0.89 |
| Invention sample 17 | 0.36 | 0.83 |
| Comparative sample 1 | 0 | 0.53 |
| Comparative sample 2 | 0.75 | 0.58 |
| Comparative sample 3 | 0.87 | 0.65 |
| Comparative sample 4 | 0 | 0.73 |
| Comparative sample 5 | 0.93 | 0.70 |
| Comparative sample 6 | 0.12 | 0.74 |
| Comparative sample 7 | 0 | 0.71 |
| Comparative sample 8 | 0.85 | 0.77 |
| Comparative sample 9 | 0.13 | 0.75 |
| Comparative sample 10 | 0 | 0.88 |
| Comparative sample 11 | 0.87 | 0.90 |
| Comparative sample 12 | 0 | 0.84 |
| Comparative sample 13 | 0.7 | 0.98 |
| Comparative sample 14 | 0 | 1.35 |

The following cutting test was conducted using the obtained samples. The cutting test is a test for evaluating fracture resistance in a depth-of-cut boundary. The conditions for the cutting test were as set forth below, and the results are shown in Table 5.

[Cutting Test]
Machining form: turning
Tool shape: CNMG120408
Workpiece: Inconel 718 (Inconel: Registered trademark)
Workpiece shape: 400 mm×φ120 mm (round bar)
Cutting rate: 30 m/min
Feed: 0.10 mm/rev
Depth of cut: 1.0 mm
Coolant: used
Evaluation items: measurement was made of the machining time to reach a time point when a sample was fractured

TABLE 5

| Sample No. | Cutting test Machining time (min) |
| --- | --- |
| Invention sample 1 | 13.5 |
| Invention sample 2 | 14.8 |
| Invention sample 3 | 26.7 |
| Invention sample 4 | 25.8 |
| Invention sample 5 | 21.9 |
| Invention sample 6 | 17.4 |
| Invention sample 7 | 23.4 |
| Invention sample 8 | 20.6 |

TABLE 5-continued

| Sample No. | Cutting test Machining time (min) |
|---|---|
| Invention sample 9 | 21.2 |
| Invention sample 10 | 15.0 |
| Invention sample 11 | 19.9 |
| Invention sample 12 | 14.4 |
| Invention sample 13 | 12.3 |
| Invention sample 14 | 13.5 |
| Invention sample 15 | 13.0 |
| Invention sample 16 | 11.3 |
| Invention sample 17 | 12.0 |
| Comparative sample 1 | 9.5 |
| Comparative sample 2 | 10.7 |
| Comparative sample 3 | 10.2 |
| Comparative sample 4 | 9.8 |
| Comparative sample 5 | 10.0 |
| Comparative sample 6 | 9.9 |
| Comparative sample 7 | 5.7 |
| Comparative sample 8 | 6.3 |
| Comparative sample 9 | 6.2 |
| Comparative sample 10 | 4.9 |
| Comparative sample 11 | 4.2 |
| Comparative sample 12 | 3.8 |
| Comparative sample 13 | 4.7 |
| Comparative sample 14 | 5.9 |

The results shown in Table 5 indicate that the machining time of each of the invention samples is 11.3 minutes or more and, in turn, indicates that such machining time is longer than that of each comparative sample, thereby leading to excellent fracture resistance.

Example 2

Using an arc ion plating apparatus, a coating layer was formed on a surface of each of the cemented carbides made under the same conditions as those for invention samples 1 to 17 in Example 1. To be more specific, firstly, a metal evaporation source was placed in a reactor of the arc ion plating apparatus. The relevant composition of the coating layer shown in Table 6 was employed as the composition of the metal evaporation source. Invention samples 18 to 34 were obtained by respectively forming coating layers, whose thicknesses are shown in Table 6, on the respective surfaces of the cemented carbides made in the same way as invention samples 1 to 17. The coating layers were formed under the same conditions as those involved in Example 1 except for the compositions and average thicknesses shown in Table 6. The same cutting test as in Example 1 was performed with regard to invention samples 18 to 34. The results are shown in Table 7.

TABLE 6

| | Coating layer | |
|---|---|---|
| Sample No. | Composition | Average thickness of the entire coating layer (μm) |
| Invention sample 18 | $(Ti_{0.4}Al_{0.6})N$ | 3.0 |
| Invention sample 19 | $(Ti_{0.4}Al_{0.6})N$ | 3.0 |
| Invention sample 20 | $(Ti_{0.4}Al_{0.4}Nb_{0.2})N$ | 3.0 |
| Invention sample 21 | $(Ti_{0.4}Al_{0.4}Cr_{0.2})N$ | 3.0 |
| Invention sample 22 | $(Ti_{0.8}Si_{0.2})N$ | 3.0 |
| Invention sample 23 | $(Al_{0.7}Cr_{0.3})N$ | 3.0 |
| Invention sample 24 | $(Ti_{0.4}Al_{0.4}Hf_{0.2})N$ | 3.0 |
| Invention sample 25 | $(Ti_{0.4}Al_{0.4}V_{0.2})N$ | 2.0 |
| Invention sample 26 | $(Ti_{0.4}Al_{0.4}Zr_{0.2})N$ | 4.0 |
| Invention sample 27 | $(Ti_{0.5}Al_{0.5})N$ | 6.0 |
| Invention sample 28 | $(Ti_{0.5}Al_{0.5})N$ | 8.0 |
| Invention sample 29 | $(Ti_{0.5}Al_{0.5})N$ | 10.0 |
| Invention sample 30 | $(Ti_{0.4}Al_{0.4}Mo_{0.2})N$ | 3.0 |
| Invention sample 31 | $(Ti_{0.2}Al_{0.35}Cr_{0.3}Si_{0.15})N$ | 3.0 |
| Invention sample 32 | $(Ti_{0.5}Al_{0.4}W_{0.1})N$ | 3.0 |
| Invention sample 33 | $(Ti_{0.5}Al_{0.4}Ta_{0.1})N$ | 3.0 |
| Invention sample 34 | TiN | 3.0 |

TABLE 7

| Sample No. | Cutting test Machining time (min) |
|---|---|
| Invention sample 18 | 14.2 |
| Invention sample 19 | 13.7 |
| Invention sample 20 | 26.4 |
| Invention sample 21 | 25.0 |
| Invention sample 22 | 19.5 |
| Invention sample 23 | 17.1 |
| Invention sample 24 | 24.0 |
| Invention sample 25 | 19.3 |
| Invention sample 26 | 22.4 |
| Invention sample 27 | 16.2 |
| Invention sample 28 | 21.1 |
| Invention sample 29 | 15.1 |

TABLE 7-continued

| Sample No. | Cutting test Machining time (min) |
|---|---|
| Invention sample 30 | 13.3 |
| Invention sample 31 | 15.9 |
| Invention sample 32 | 13.4 |
| Invention sample 33 | 11.9 |
| Invention sample 34 | 11.5 |

The results shown in Table 7 indicate that the machining time of any of invention samples 18 to 34 is 11.5 minutes or more and, in turn, indicates that such machining time is longer than that of each comparative sample, thereby leading to excellent fracture resistance.

INDUSTRIAL APPLICABILITY

Each of the cemented carbide and the coated cemented carbide according to the present invention contains a Zr carboxide and therefore has improved high-temperature strength and excellent fracture resistance. Accordingly, particularly in the machining of difficult-to-machine materials, each of such cemented carbide and such coated cemented carbide can be suitably used for a cutting tool and is therefore, in such respect, worth being used from an industrial viewpoint.

What is claimed is:

1. A cemented carbide comprising a hard phase containing tungsten carbide as its main component and a binder phase containing an element of at least one kind selected from the group consisting of Co, Ni and Fe as its main component, wherein:
   the cemented carbide comprises 75 mass % or more to 95 mass % or less of the hard phase and 5 mass % or more to 25 mass % or less of the binder phase in an inner region inner than a position of 500 μm in depth below a surface of the cemented carbide;
   the hard phase comprises a Zr carboxide; and
   $Zr_{sur}/Zr_{in}$ is from 0.25 or more to 0.80 or less, wherein an average content (volume %) of the Zr carboxide in a surface region which ranges from the surface of the cemented carbide to a depth of 500 μm therebelow is denoted by $Zr_{sur}$ and an average content (volume %) of the Zr carboxide in an inner region inner than the surface region is denoted by $Zr_{in}$.

2. The cemented carbide according to claim 1, wherein, in an inner region inner than a position of 500 μm in depth below the surface of the cemented carbide, a content of the Zr carboxide is from 0.05 mass % or more to 3.5 mass % or less based on the inner region in its entirety.

3. The cemented carbide according to claim 1, wherein:
   the binder phase comprises Co as its main component; and
   $Co_{sur}/Co_{in}$ is from 0.60 or more to 0.90 or less, wherein an average content (mass %) of Co in a region which ranges from the surface of the cemented carbide to a depth of 5 μm therebelow is denoted by $Co_{sur}$ and an average content (mass %) of Co in an inner region inner than a position of 5 μm in depth below the surface of the cemented carbide is denoted by $Co_{in}$.

4. The cemented carbide according to claim 1, wherein the hard phase further comprises a carbide, a nitride or a carbonitride of a metal element of at least one kind selected from the group consisting of Ti, Zr, Hf, V, Nb, Ta, Cr and Mo.

5. A coated cemented carbide comprising: the cemented carbide according to claim 1; and a coating layer comprising a compound of a metal element of at least one kind selected from the group consisting of Ti, Zr, Hf, V, Nb, Ta, Cr, Mo, W, Al and Si, and a non-metal element of at least one kind selected from the group consisting of C, N, O and B, the coating layer being formed on the surface of the cemented carbide.

6. The coated cemented carbide according to claim 5, wherein the coating layer is a single layer or a laminate of two or more layers.

7. The coated cemented carbide according to claim 5, wherein an average thickness of the coating layer in its entirety is from 1.0 μm or more to 10 μm or less.

8. The cemented carbide according to claim 2, wherein:
   the binder phase comprises Co as its main component; and
   $Co_{sur}/Co_{in}$ is from 0.60 or more to 0.90 or less, wherein an average content (mass %) of Co in a region which ranges from the surface of the cemented carbide to a depth of 5 μm therebelow is denoted by $Co_{sur}$ and an average content (mass %) of Co in an inner region inner than a position of 5 μm in depth below the surface of the cemented carbide is denoted by $Co_{in}$.

9. The cemented carbide according to claim 8, wherein the hard phase further comprises a carbide, a nitride or a carbonitride of a metal element of at least one kind selected from the group consisting of Ti, Zr, Hf, V, Nb, Ta, Cr and Mo.

10. The cemented carbide according to claim 2, wherein the hard phase further comprises a carbide, a nitride or a carbonitride of a metal element of at least one kind selected from the group consisting of Ti, Zr, Hf, V, Nb, Ta, Cr and Mo.

11. The cemented carbide according to claim 3, wherein the hard phase further comprises a carbide, a nitride or a carbonitride of a metal element of at least one kind selected from the group consisting of Ti, Zr, Hf, V, Nb, Ta, Cr and Mo.

12. A coated cemented carbide comprising: the cemented carbide according to claim 2; and a coating layer comprising a compound of a metal element of at least one kind selected from the group consisting of Ti, Zr, Hf, V, Nb, Ta, Cr, Mo, W, Al and Si, and a non-metal element of at least one kind selected from the group consisting of C, N, O and B, the coating layer being formed on the surface of the cemented carbide.

13. The coated cemented carbide according to claim 12, wherein the coating layer is a single layer or a laminate of two or more layers.

14. The coated cemented carbide according to claim 12, wherein an average thickness of the coating layer in its entirety is from 1.0 μm or more to 10 μm or less.

15. A coated cemented carbide comprising: the cemented carbide according to claim 3; and a coating layer comprising a compound of a metal element of at least one kind selected from the group consisting of Ti, Zr, Hf, V, Nb, Ta, Cr, Mo, W, Al and Si, and a non-metal element of at least one kind selected from the group consisting of C, N, O and B, the coating layer being formed on the surface of the cemented carbide.

16. The coated cemented carbide according to claim 15, wherein the coating layer is a single layer or a laminate of two or more layers.

17. The coated cemented carbide according to claim 15, wherein an average thickness of the coating layer in its entirety is from 1.0 μm or more to 10 μm or less.

18. A coated cemented carbide comprising: the cemented carbide according to claim 4; and a coating layer comprising a compound of a metal element of at least one kind selected from the group consisting of Ti, Zr, Hf, V, Nb, Ta, Cr, Mo, W, Al and Si, and a non-metal element of at least one kind selected from the group consisting of C, N, O and B, the coating layer being formed on the surface of the cemented carbide.

19. The coated cemented carbide according to claim 18, wherein an average thickness of the coating layer in its entirety is from 1.0 μm or more to 10 μm or less.

20. The coated cemented carbide according to claim 6, wherein an average thickness of the coating layer in its entirety is from 1.0 μm or more to 10 μm or less.

* * * * *